United States Patent [19]
Crippa

[11] Patent Number: 5,534,761
[45] Date of Patent: Jul. 9, 1996

[54] MECHANISM FOR MOVEMENTS OF PREFIXED PATH, REFERABLE AS OF ELLIPTICAL SHAPE

[76] Inventor: Ugo Crippa, Via Brioschi 16, Sirtori, Italy

[21] Appl. No.: 140,071

[22] PCT Filed: Dec. 17, 1991

[86] PCT No.: PCT/IT91/00111

§ 371 Date: Oct. 28, 1993

§ 102(e) Date: Oct. 28, 1993

[87] PCT Pub. No.: WO92/20495

PCT Pub. Date: Nov. 26, 1992

[30] Foreign Application Priority Data

May 21, 1992 [IT] Italy ................ MI91A1392

[51] Int. Cl.⁶ ...................................... B25J 18/00
[52] U.S. Cl. .................. 318/568.1; 318/568.11; 318/568.12; 414/744.3; 414/744.5; 901/19; 901/26
[58] Field of Search ............... 318/560–646; 901/2, 3, 5, 7, 9, 13, 15–20; 395/80–90; 414/730–744.5, 917, 749

[56] References Cited

U.S. PATENT DOCUMENTS

| | | |
|---|---|---|
| 3,561,614 | 2/1971 | Tezuka et al. |
| 3,587,872 | 6/1971 | Pauly . |
| 4,492,510 | 1/1985 | Tanii et al. ................ 901/19 |
| 4,636,138 | 1/1987 | Gorman . |
| 4,674,947 | 6/1987 | Hamada et al. .......... 414/735 |
| 4,702,668 | 10/1987 | Carlisle et al. ............ 901/25 |
| 4,712,971 | 12/1987 | Fyler ...................... 901/15 |
| 4,797,061 | 1/1989 | Munakata ................ 901/15 |
| 4,813,846 | 3/1989 | Helms ..................... 901/23 |
| 4,984,959 | 1/1991 | Kato ....................... 901/19 |
| 5,046,915 | 9/1991 | Azuma et al. ............ 901/25 |
| 5,049,029 | 9/1991 | Mitsui et al. ............. 414/744.5 |
| 5,151,008 | 9/1992 | Ishida et al. ............. 414/744.5 |
| 5,197,846 | 3/1993 | Uno et al. ................ 414/731 |
| 5,214,749 | 5/1993 | Brown .................... 395/95 |
| 5,271,292 | 12/1993 | Sawada ................... 74/479 BF |

FOREIGN PATENT DOCUMENTS

| | | |
|---|---|---|
| 0008981 | 3/1980 | European Pat. Off. . |
| 0065859 | 1/1982 | European Pat. Off. . |
| 0076947 | 4/1983 | European Pat. Off. . |
| 0291292 | 11/1988 | European Pat. Off. . |
| 2593106 | 7/1987 | France . |
| 2802738 | 7/1979 | Germany . |
| 2022046 | 6/1979 | United Kingdom . |
| WO9104138 | 4/1991 | WIPO . |

*Primary Examiner*—Paul Ip
*Attorney, Agent, or Firm*—Panitch Schwarze Jacobs & Nadel

[57] ABSTRACT

A mechanism for movement of an object along a prefixed path, substantially of elliptical shape, including a support base provided with a single motor and at least two arms linked to each other at one end, with the free end of the outer arm carrying a supporting means for articles to be moved, thus forming a handling device. The arms, are rotated about parallel axes by a drive system located inside of the arms. The drive system has a transmission ratio associated with the connection between each arm. The paths along which the arms successive to the first one move are defined by the transmission ratios. The transmission ratio in the outermost arm determines the translation and possible contemporaneous rotation of the supporting means.

9 Claims, 5 Drawing Sheets

MECHANISM FOR MOVEMENTS OF PREFIXED PATH, REFERABLE AS OF ELLIPTICAL SHAPE

BACKGROUND OF THE INVENTION

1. Field of the Invention

The present invention relates to a mechanism for movement of articles along a prefixed path, with the path preferably having an elliptical shape.

2. Description of the Prior Art

In many industrial systems and plants it is required that some articles are moved along a prefixed path, especially when assembling or treating products. For example, it is often necessary to transfer component parts, members and articles in general, between two predetermined positions of the system. For instance the assembled or finished products from a manufacturing line have to be moved from the assembly final station to a transporter which carries them to the quality control, store or shipping departments.

For the sake of simplicity, in the following specification reference will be expressly made to the transfer of a finished article from the assembling line (or island) to the conveying system which collects the manufactured articles (generally from various lines or islands) and transports the same to successive operating steps, although such an application is only an illustrative example, in no way considered limiting to the possible uses of the device according to the invention.

To this aim, according to a known solution, special transferring devices are used with an intermediate station, with the transferring devices comprising a trolley or the like, provided with grasping means and suitable provisions to move along a rail or guide generally extending crosswise with respect to the feed direction of the manufacturing line and/or the discharge conveyor.

Such a transferring device was found to be unsatisfactory for various reasons. First of all, the device has a considerable and permanent encumbrance, due to the presence of a track, and generally requires a special construction based on the features of the system, such as the distance between manufacturing line and transferring device.

Secondly, the performance of this type of device is rather poor. For example two grasping means (pliers or the like) are generally required, cantilevered on a support to obtain the translating motion and to place the article onto the trolley or take it therefrom, the transfer speed is low (of about 1 meter/second) and the sequence of the steps further increases the total transfer time. In addition, although the followed path (law of movement) can be theoretically programmed, in practice this is usually not economical. Additionally, the device may be noisy.

The use of a true robot has also been proposed, having an arm with four degrees of freedom and a grasping means at its end. However, such a solution, although providing reduced encumbrance and good flexibility both for applicability and possibilities of path, requires the use of a device which is undoubtedly exuberant in relation with the task to be performed, and consequently involves an inadequate use thereof, resulting in unnecessarily high costs.

An object of the present invention is to overcome the above-illustrated inconveniences and limitations of the known devices, and in particular to provide a self-supporting mechanism of simple construction, and consequently of low cost, which, at the same time provides for flexible usage which can be adapted to different situations, with the mechanism having reduced encumbrance and requiring no fixed installations for its operation. It has been realized that the various paths adopted in practice, as exemplified by the above cases, can be made to descend in almost all cases from an elliptical path, since varying the eccentricity from 0 to 1 provides paths which range from circular to rectilinear motion (harmonic or rectilinear, non uniform), as particular cases of the elliptical path.

Therefore, it is another object of the present invention to provide a mechanism which, being driven by only one driving means, is capable of moving the free end of an outermost arm along a path defined according to the general equation of an ellipse having its center corresponding with the support base, or more precisely, with the center of the ellipse corresponding to the pivoting axis of the first of a plurality of arms on the support base.

SUMMARY OF THE INVENTION

The present invention achieves these objects by means of a mechanism for carrying articles along a prefixed path comprising:

a support base provided with motor means and at least first and last arms, each of the arms having an inner end and an outer end, the inner ends being nearer to said support base and the outer ends being more distant therefrom, the inner ends of each of the second and subsequent arms being rotatably linked to the outer end of the adjacent arm nearer to said support base, with the first arm having the inner end linked to said support base, the first arm being rotatable upon actuation of said motor means, the last, most external arm having its free end provided with a support means.

Transmission means are located inside each arm for rotating each arm with respect to the inner contiguous arm and to determine either the resulting translatory movement only of said grasping means or its rotation with respect to the support base, as a consequence of the respective transmission ratios.

According to a preferred aspect of the invention such transmission means advantageously comprises, in its embodiment with three arms, a first transmission means in the first, most internal arm being linked between the support base and the second arm to actuate the rotation of the latter.

A second transmission means is located in said second arm, and is linked between the most external end of said first arm and the third arm to actuate the rotation of the latter.

A third transmission means is linked between the most external end of said second arm and said support means to drive the latter.

Driving means link said motor means and the said first arm to actuate the rotation of the latter.

The versatility of the device makes its use in various fields requiring the rapid transportation of articles along a predetermined path easy, even with the possibility of rotating the article by a prefixed angle, as well as entering narrow spaces, hardly attainable with traditional devices.

The mechanism according to the invention allows a broad variety of paths to be obtained. Furthermore the handling device employs only one motor, by means of which a number of movements can be obtained and, when the mechanism is withdrawn at half stroke, it shows a very reduced space occupied, in the area of the support base only, whose central position reduces by half the overall cantilever between the outer points of the path to be performed.

These and additional features will become clear, together with the relevant advantages, from the following description of some preferred, non-limiting embodiments of the mechanism object of the invention, when taken in combination with the annexed drawings, in which:

DESCRIPTION OF THE PREFERRED EMBODIMENTS

Figure 1:
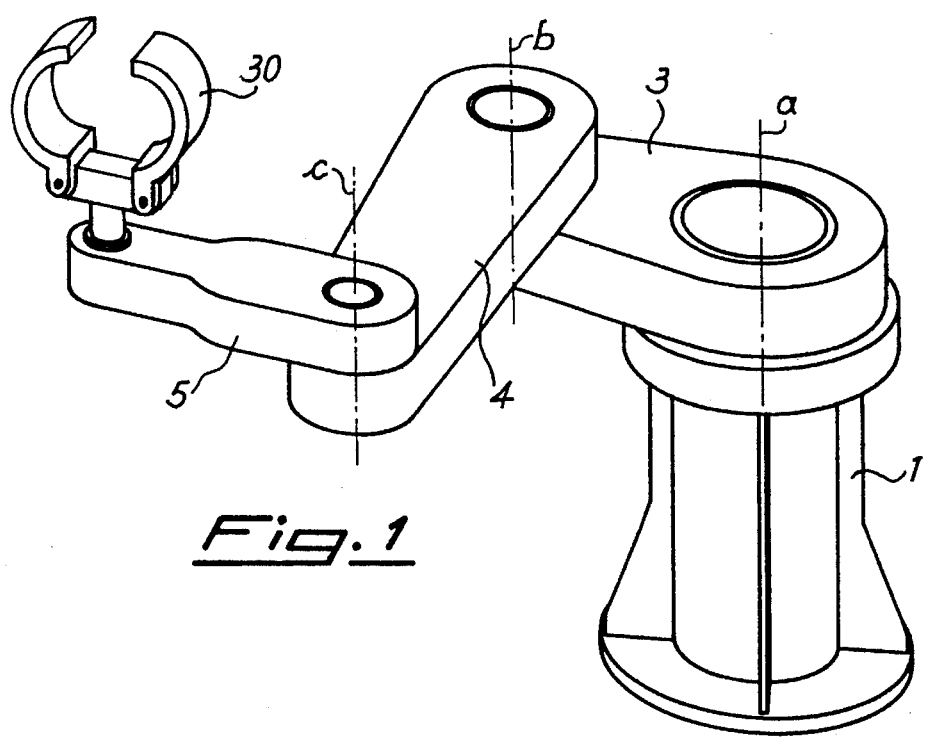
FIG. 1 schematically shows in perspective the construction of a mechanism with three arms according to the invention as a handling device.

With reference to FIG. 1, the mechanism according to the invention comprises a support base 1 provided with motor means, not shown, such as a hydraulic cylinder or an electric motor, and first, second and third (or last) arms, linked to each other at the ends, respectively 3, 4 and 5. The crosswise size or thickness of the three arms are preferably decreasing toward the outside for static reasons and the two ends of each arm are also defined, for the sake of identification, as inner and outer respectively, with inner end being meant the one nearer to a first axis (a) of the support base 1.

The free end of the third arm 5 supports a support or grasping means, such as a simple supporting profile or a clamp 30, having two jaws, and the inner end of arm 3 is connected to base 1. The first, second and third arms 3, 4, and 5 are preferably rotated about first, second and third mutually parallel axes (a, b, c vertical in the example of FIG. 1). These rotations are all controlled, with the resulting translation and possible rotation of clamp or support 30, by the single motor in the base, through transmission means, described in detail below.

Figure 2:
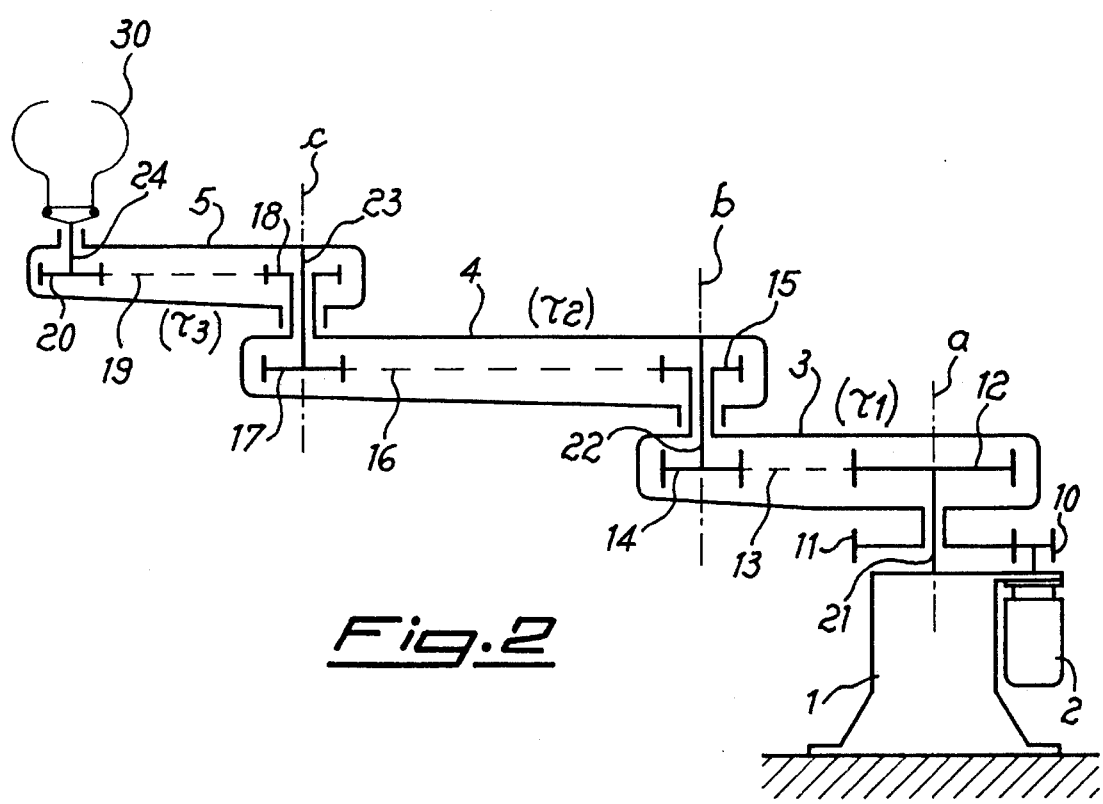
FIG. 2 is a schematic view showing the operation of the mechanism of FIG. 1.

Reference will be now made to FIG. 2, which schematically illustrates a longitudinal section of a next embodiment of the invention, again with three arms. The same numeral references of FIG. 1 have been used for the same or substantially equivalent parts.

The motor 2 is mounted on the support base 1, at an outer position. Preferably, the motor comprises an electric motor 2 having a shaft which drives a toothed wheel or gear 10. The toothed wheel 10 meshes with a gear 11 which is integral with the first arm 3. The inner end of the first arm 3 is rotatably coupled to said support base 1. Therefore, the first arm 3 can rotate about the first axis (a) upon actuation of said motor 2.

In the description reference will be made to transmission devices based on toothed wheels and chains, or on belts and pulleys, also toothed, but it is clear that other equivalent transmission devices can be used without departing from the scope of the invention.

Referring to FIG. 2, the second arm 4 has its inner end rotatably coupled to the outer end of said first arm 3. The second arm 4 is caused to rotate with respect to the first arm 3 by a first transmission means for rotating the second arm 4, comprising a toothed belt 13 wound around first and second toothed wheels 12 and 14, positioned at the inner and outer ends, respectively, of the first arm 3.

The first toothed wheel 12 is mounted on a first short vertical shaft 21, having an axis coincident with the first axis (a), and is fixedly mounted at its lower portion to the base 1. The first toothed wheel 12 is linked through belt 13 to the second toothed wheel 14. The second toothed wheel 14 is mounted at the first end of a second short vertical shaft 22, which defines the second axis (b). The second end of the vertical shaft 22 is integral with the body of the second arm 4. The first and second shafts 21 and 22 are coincident with the first and second rotation axes respectively (a, b) of the first and the second arms 3, 4. The first axis (a) is stationary, whereas the second axis (b) moves together with the outer end of arm 3 thus following a circular path. As schematically shown in FIG. 2, these shafts 21, 22 may pass through sleeves formed at the arm ends or the construction may be different, such as that represented in FIGS. 5 and 5a.

For the first transmission means a transmission ratio τ1 is defined, where τ1 is the ratio between the number of teeth of the two toothed wheels or gears 12, 14. It is clear that when using different transmission devices, as reported in the following, ratio τ1 is defined generally as the ratio between two angular velocities, such as the angular velocities of the toothed wheel 11 (and consequently of the first arm 3) and of the second arm 4 with respect to the first arm 3.

Still with reference to FIG. 2, the third arm 5 has its inner end rotatably linked to the outer end of the second arm 4. The outer end of the third arm 5 is provided with a clamp 30 or any other support device providing the grasping or support means.

As shown in FIG. 2, the third arm 5 is caused to rotate with respect to the second arm 4 by a second transmission means comprising a belt 16 being wound around third and fourth toothed wheels 15, 17 provided at either ends of the second arm 4. The third wheel 15 is preferably integral with the outer end of arm 3. An axial bore is defined through the third wheel 15, and the second short shaft or hub 22 extends through the bore. The second shaft 22 has a first end which is affixed to the second toothed wheel 14 and a second end which is affixed to the inner end of the second arm 4. The fourth toothed wheel 17 is mounted at the end of a third short shaft or hub 23 (coincident with the third axis c) the other end of which is integral with the inner end of the third arm 5. The transmission ratio of this second transmission means is indicated with τ2, which is defined in a similar manner to τ1, and determines the angular velocity of the third arm 5 with respect to the second arm 4.

Finally, there is provided a third transmission means comprising a belt 19 and fifth and sixth toothed wheels 18, 20, respectively, which are structurally similar to the second transmission means, with ratio τ3. The sixth toothed wheel 20 is mounted at the end of a short shaft or hub 24, the rotation of which with respect to the third axis c determines the motion and/or rotation of clamp 30, depending upon the value of τ3.

By operating the motor 2, the first arm 3 is caused to rotate (about the first axis (a) by the motor gear 10 acting on gear 11 and, consequently, the second toothed wheel 14 is also caused to rotate due to the movement of the first arm 3, which radially translates the second shaft 22. The second shaft 22 is rotated as it is radially translated by the belt 13 acting on the second toothed wheel 14. Furthermore, the rotation of the second toothed wheel 14 about the second axis (b) by belt 13 and toothed wheel 12, according to τ1, causes the rotation of the second arm 4 about the second axis (b), in addition to a revolving movement about the first axis (a). At the same time, the rotation of second arm 4 determines the radial translation and rotation of the fourth toothed wheel 17 about the third axis (c). This causes the rotation of third arm 5 (about third axis (c)) relative to the second arm 4 in a similar manner to the rotation of the second arm 4 relative to the first arm 3. The relative movement of the first, second and third arms 3, 4 and 5 determines the resulting path of the free end (or outermost end) of the third arm 5, as explained above, with the translatory motion of the clamp 30 and/or a possible rotation of the clamp 30 about the axis thereof, being determined in accordance with τ3.

Figure 3:
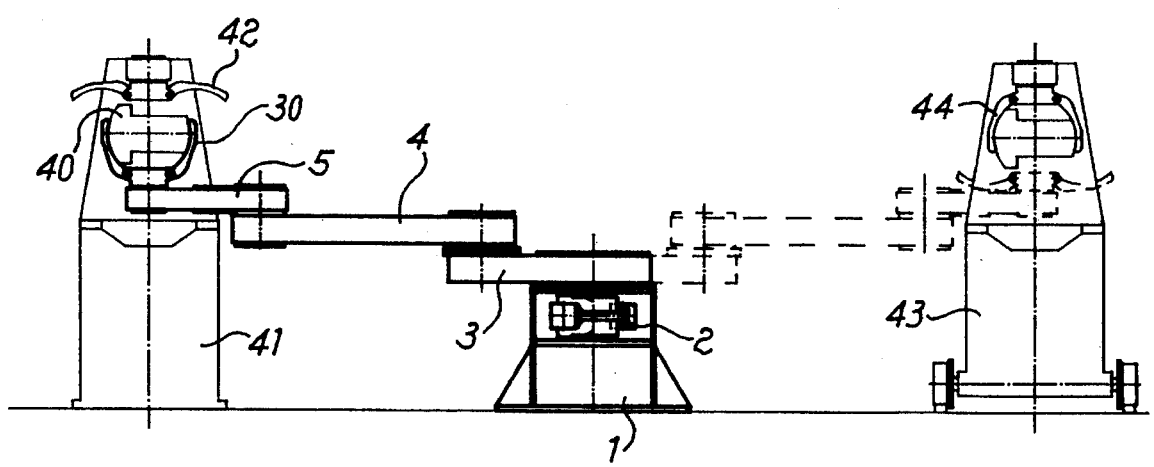
FIG. 3 shows a way using the mechanism according to the invention as a handling device in an assembling system.

FIG. 3 illustrates how the handling device is used to transfer an article 40 from a manufacturing line 41, where the article is held by a clamp 42, to a conveyor line 43, where the article is taken and transported by a clamp 44. The handling device is shown with the first, second and third arms 3, 4 and 5 (not necessary at maximum extension) extending towards the manufacturing line 41. The handling device is also shown (in phantom) with arms 3, 4 and 5 extended towards the conveyor line 43. Although it is preferable, the extension is not necessarily symmetrical in both cases. A cylinder operated by a fluid under pressure has been shown here as the motor means 2.

Furthermore, it should be appreciated that, if necessary, during the transfer, article 40 could undergo a rotation, whereby it can reach the conveyor line 43 rotated by n degrees with respect to the position at which it has been taken from line 41.

As illustrated in FIGS. 1–3, arms 3, 4, 5 are preferably formed as elongated closed bodies with the first, second and third corresponding transmission devices positioned within the respective closed bodies. This solution is preferable for various reasons, in particular to protect the transmission devices against dust, moisture and other damaging substances, as well as to reduce its encumbrance and for safety reasons for personnel. However, different solutions could be adopted, which one skilled in the art will be able to easily identify based upon particular applications.

Figure 4:
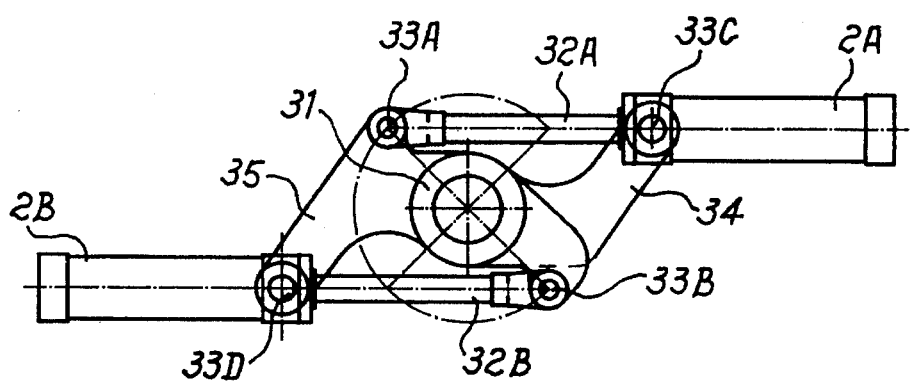
FIG. 4 schematically shows, in a plan view, a particular embodiment of the device having a pair of cylinders with fluid under pressure.

FIG. 4 shows an alternative embodiment of the handling device in which the motor means comprises a pair of cylinders (hydraulic or pneumatic) 2A, 2B, both provided with pistons 32A, 32B, respectively, which are hingedly connected to levers 34, 35 at 33A-33D, thus imparting the necessary bidirectional rotation to a shaft 31. By using a double action cylinder, it is possible to obtain the movement with a single cylinder and a suitable driving device.

Figure 5A:
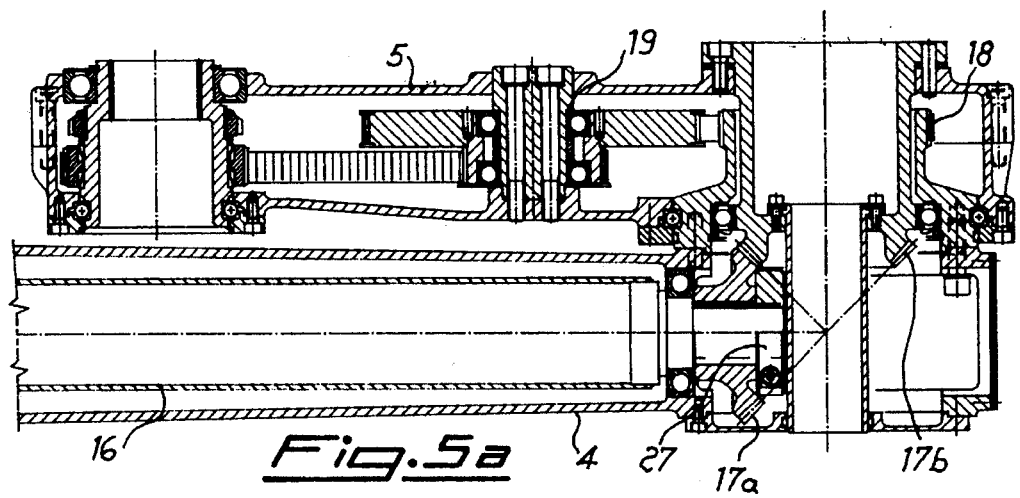
FIG. 5a shows, in a greater scale, the detail of FIG. 5 referred to as X and encircled by a dotted line.
Figure 5:
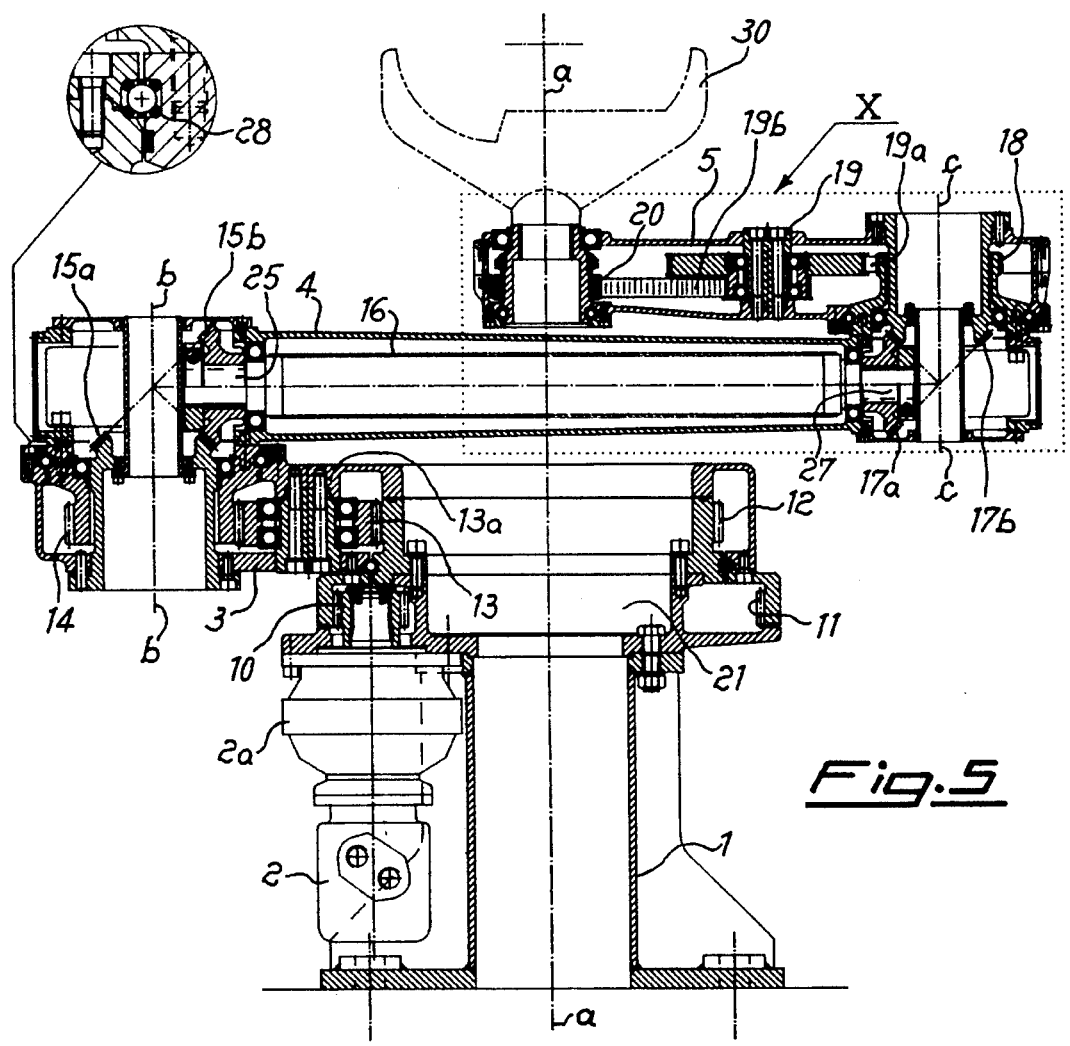
FIG. 5 shows a sectional view of a preferred embodiment of the mechanism according to the invention.

FIGS. 5 and 5a show another preferred embodiment of the linkages between the arms.

In FIGS. 5 and 5a elements corresponding or similar to those elements described in the previous embodiments bear the same numeral references. Motor means 2 is in this case a hydraulic motor, co-axial with an epicyclic speed reduction gear 2a at the outlet of which there is integrally mounted a pinion 10. The pinion 10 engages an internal toothed gear 11, which is preferably integral with the first arm 3 and co-axial with the first axis (a). A first toothed wheel 12 is also mounted to the base 1 by means of the structure 21, co-axial with the first axis (a). The second toothed wheel 14 is mounted at the outer end of the first arm 3, about the second rotation axis (b) of the second arm 4, integrally with arm 4 itself, similar to the embodiment of FIG. 2. The first transmission means 13 between the first and second wheels 12, 14 is provided in this case by an idle gear 13, which is rotatable about an axis 13a defined by a shaft fixed to said first arm 3.

Again, co-axially with the second axis (b) and integral to the first arm 3, there is provided a first bevel gear 15a which meshes with a second bevel gear 15b. The second bevel gear 15b is rigidly connected to a first end of a shaft 16, rotatably mounted in the second arm 4. A third bevel gear 17a is attached to a second end of the shaft 16 in the proximity of the outer end of said second arm 4. A fourth bevel gear 17b is provided in meshing engagement with the third bevel gear 17a. Preferably, the fourth bevel gear 17b is integrally mounted to the third arm 5 for rotating about the third rotation axis (c). A toothed wheel 18 is also mounted co-axially with the third axis (c). The toothed wheel 18 is preferably formed integrally with the second arm 4, and is connected to the most external toothed wheel 20, at the end of third arm 5, through a transmission means comprising a speed-reducing gear 19. The drive between the reducing gear 19 and the toothed wheels 18 and 20 is provided e.g. by means of toothed belts 19a and 19b, respectively. By changing the reducing gear 19, it is possible to modify the transmission ratio τ3 and consequently to vary the rotation of wheel 20 about the third axis (c), i.e., to provide movement of the so-called "wrist" of the mechanism, on which the grasping or support means 30 is mounted.

From the above, the constructional variations with respect to the embodiment described with reference to FIG. 2 are self-evident, but it will be appreciated that these embodiments are perfectly equivalent. The transmission ratios τ1, τ2, τ3, are determined in any case by the ratio between the diameters or number of teeth shown by the gears, toothed wheels, bevel gear pairs or the like at the inner and outer ends of each arm, with additional variations to τ3 being possible due to the presence of speed reduction gear 19.

Additionally, it will be noted that operation by means of a hydraulic motor, as here assumed, allows the mechanism to carry out continuous rotations or alternate motions in a relatively simple way.

Still with reference to FIG. 5, preferably friction-locking units 25, 27 are provided on one of the bevel gears of each pair, and namely on 15b and 17a. The friction-locking units 25, 27, also called "adaptors", are provided in order to phase the arms to each other, mainly to set the reciprocal positions for varying the eccentricity of the resulting elliptical motion.

Referring to FIG. 5a, the movement of arms 3, 4, 5 is provided by rigid transmission devices, whereas the "wrist" or axis of the grasping means 30, coincident with toothed wheel 20, is driven by toothed belts. The size of said most external toothed wheel 20 or "wrist" is also advantageously reduced by adopting the speed reducing gear 19, since the most suitable transmission ratio τ3 can be obtained through an intervention onto the reducing gear itself rather than on the relative size ratios between gears 18, 20. From FIGS. 5, 5a, it is also clear that the arms 3, 4 and 5 are mutually joined through pre-loaded step boxes or thrust bearings having radial, axial and anti-tilting functions (see enlarged detail X).

In the embodiment of FIGS. 5 and 5a, there are additionally provided some advantageous possibilities, such as that of allowing the passage of rotating connectors through the arm linkages in order to provide electrical, hydraulic and pneumatic feeds to the wrist with clamp 30, even with continuously rotating arms. It is also possible to provide a column capable of vertical movement of the support 1 to move the whole mechanism. Preferably, the column for vertical movement is driven by a hydraulic cylinder. A differential gear can be applied which is operated by a second motor, in addition to the motor means 2, thus obtaining two driven axes, with a solution which can be particularly advantageous in case of a remarkable extension of the arms, throughout a broad working area.

Finally, it will be appreciated that in FIG. 5 the second arm 4 length is twice the length of the first and third arms 3, 5, which are equal. With these size ratios the rotation of arm 4 occurs always about its middle point with a consequent reduced moment of inertia.

The path along which the grasping means moves can be varied and is defined through the choice of the transmission ratios $\tau 1$ and $\tau 2$, in addition to the relative length of the first, second and third arms 3, 4 and 5.

Figure 7:
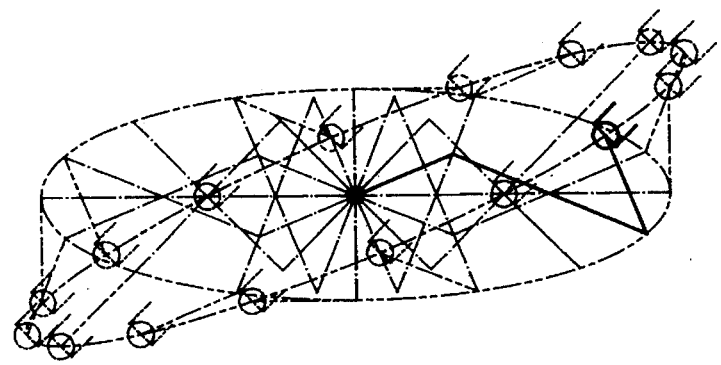
Figure 8:
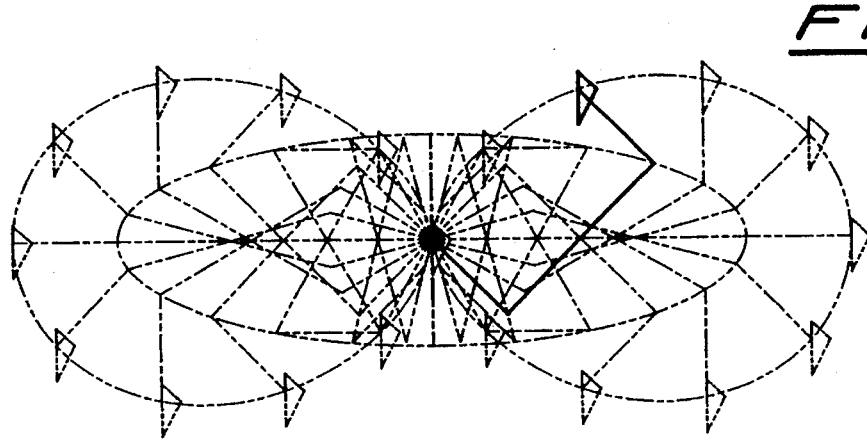
Figure 9:
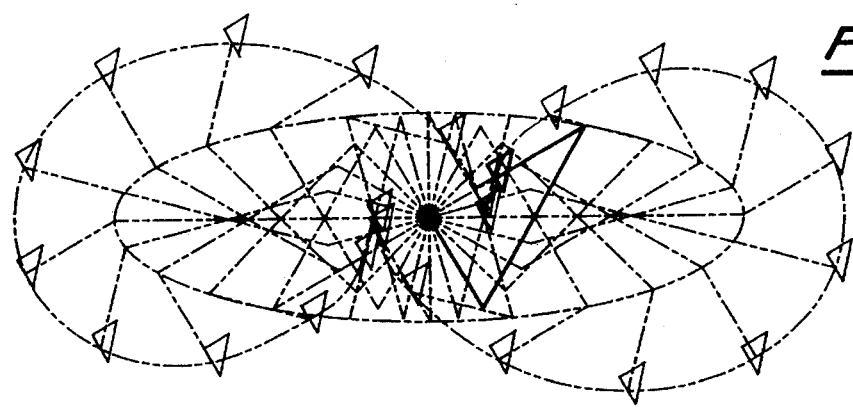

In general curved paths are obtained which, according to the number of arms of the mechanism, can widely vary from each other. While first axis (a) always follows a circumference, the second axis (b) at the end of the second arm 4 describes in almost all the cases an ellipse, as it appears from the broken lines of FIGS. 6–9. In the embodiments with three arms, where at the free end of the third arm 5 (wrist) there is mounted a grasping means, the most varied paths may be had from the rectilinear one of FIG. 6, performing a linear harmonic motion, to the elliptical shape with angled axes with respect to the ellipse described by the second arm end (see FIG. 7) to that of the double-ovoidal shape with central knot, referable to a crossed ellipse (FIG. 8), which could also lead to paths with more crossing points, thus forming trilobate curves, or cyclic paths as shown in FIG. 9. The parameters to obtain all these types of paths (even more complex ones could be obtained with a greater number of arms) are still the ratio between the length of various arms, the associated transmission ratios and the mutual spatial relationships between the arms themselves.

Figure 6:
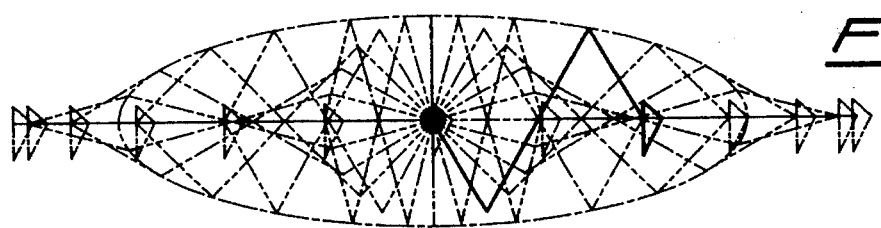
FIGS. 6–9 show different possible paths performed by the mechanism according to the invention.

Particularly important is the rectilinear harmonic motion path of FIG. 6, with which the mechanism can be used in the field of long straddle feeds with a reduced number of errors in repetitions, as it can be inserted e.g. as a mechanism for the reciprocating movement of the saddle of a planar or other machine tool.

On the other hand, with curved paths, the body being carried can be guided along curve ways, with considerable frequencies by exploiting the possibility of avoiding obstacles or the like, so as to be inserted exactly at a prefixed point at the end of the stroke and in the desired orientation.

Figure 10:
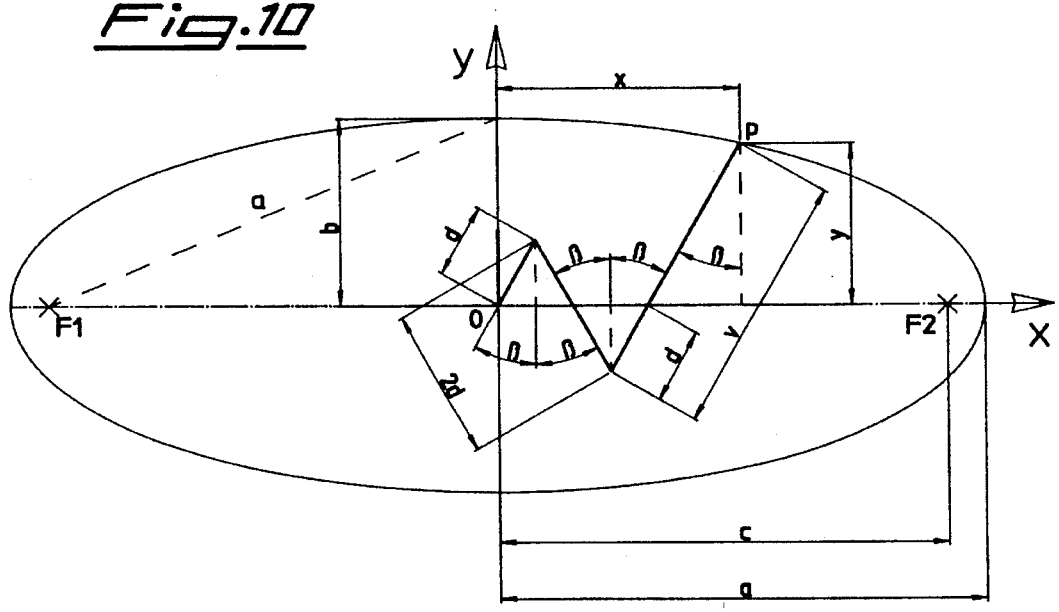
FIG. 10 geometrically shows how to obtain an elliptical path with a mechanism according to the invention.

With reference of FIG. 10, it is possible to see how an elliptical path can be obtained and therefrom, through a suitable variation of parameters, either a circular or a harmonic rectilinear motion which may be considered as particular cases of an ellipse. When assuming two Cartesian axes X and Y having the origin 0 at the ellipse center, corresponding to the first axis (a) of the first arm 3 as considered above, if d is the length of the first arm, 2d is the length of the second arm and v is the length of the third arm, one has as a consequence that the longer axis of the ellipse corresponds to $3d + v = 4d + (v-d)$, where v-d is equal to the shorter axis b and at any moment the abscissa $x_p$ of a point P on the path, associate to the position of a transported article is equal to $x_p = [4d + (v-d)] \sin \beta$, where $\beta$ is the semi-angle comprised between the arms, assuming that the triangles ideally generated by the arms with axis X are all isosceles. Another consequence is that the ordinate $y_p$ of point P, is equal to: $y_p = (v-d) \cos \beta$.

The general equation of an ellipse, as it is known, is given by:

$$\frac{x^2}{a^2} + \frac{y^2}{b^2} = 1$$

and, if the above-indicated values for coordinates of point P are replaced, it is obtained:

$$\frac{[4d+(v-d)]^2 \sin\beta^2}{[4d+(v-d)]^2} + \frac{(v-d)^2 \cos\beta^2}{(v-d)^2} = \sin\beta^2 + \cos\beta^2 = 1$$

which is a result well-known geometrically. Therefore, the ellipse equation is satisfied and this is a confirmation that the point actually describes an elliptical path in which the eccentricity $e=c/a<1$ where $$c = \sqrt{a^b - b^2}$$

It results therefrom that for v-d=0, i.e., if the third arm has the same length as the first one, equal to one-half of the second arm length, one has e=1 and the ellipse flattens so as to become a straight line coincident with axis X. The resulting movement is thereby a harmonic rectilinear motion. When a=b, the consequence is e=0 and a circular path.

Figure 11:
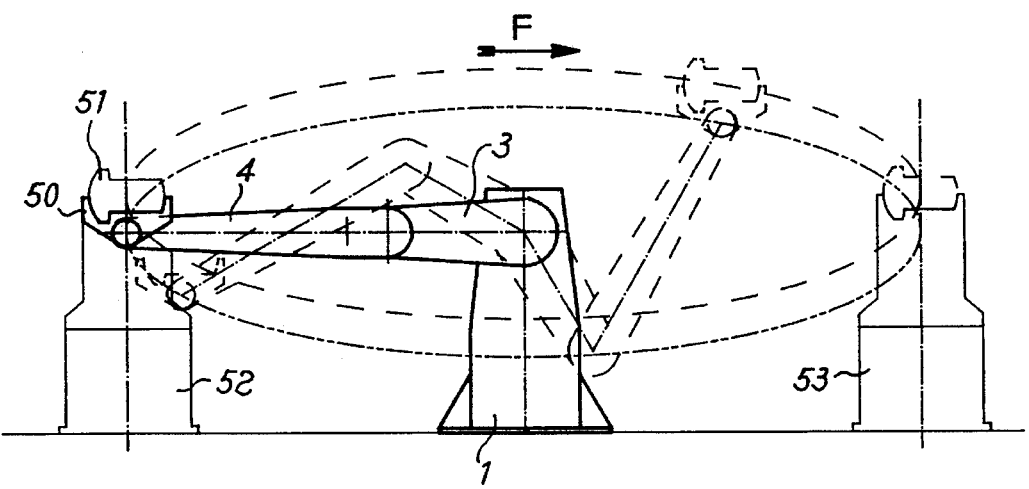
FIG. 11 shows an embodiment of mechanism with two arms, suitable to follow an elliptical path in a vertical plane.

With reference to FIG. 11 a mechanism according to the invention is shown, having only two arms, the elliptical path of which develops in a substantially vertical plane. In this case, contrary to the previous embodiments, the arm axes are horizontal. The system requires a balancing of the loads and allows the transfer of an article 51, represented in the drawing as being mushroom-shaped, resting on a support profile 50 while keeping a constantly horizontal orientation, without any interference at catch and release stations 52 and 53 respectively, if the rotation occurs in the direction shown by arrow F. It should also be appreciated that, thanks to a well-known physical law, along the elliptical path originated by a uniform circular motion, the instant speed of the article 51 is subject to a continuous variation. Such a speed has its lowest value at the point where the article is caught and released respectively, and the highest value at the middle (in other words it is inversely proportional to the distance from the ellipse center).

As already mentioned above, any transmission means can be provided by a different device with respect to those illustrated, such as plane belts, chains, gears, racks, steel strips, metal and non-metal ropes, levers or also combinations of these elements among them.

With reference to the motor means, this can be either an electric motor, of the d.c. or a.c. type, or a hydraulic motor (FIG. 5) or any other device, for example, a cylinder as shown in FIGS. 3 and 4.

It appears clearly the advantage obtained, according to the invention, concerning the possibility of reducing the overall straddle length, as the support of the mechanism is at midway of the stroke to be performed; even more appreciable advantage in case of handling heavy articles.

Although the invention has been described with reference to particular and preferred embodiments, especially a handling device, it should not be considered restricted to such a description, but it is meant to be extended to include additional variations and modifications which will be understood by those skilled in the art in view of the present disclosure, only some of which have been indicated previously by way of example without going through all the possibilities of the invention. In particular, when using certain special types of motor means, known in the art, intermediate points of stop can be determined at prefixed stations along the paths which will be chosen at each time according to the requirements.

I claim:

1. A mechanism for providing a predetermined elliptical movement comprising:

a support base (1);

three arms including a first arm (3), a second arm (4) and a third arm (5) attached to the support base, each of the arms having an inner end and an outer end, the inner end of the first arm (3) being rotatably coupled to the support base, defining a first rotation axis (a), the inner end of the second arm (4) being rotatably coupled to the outer end of the first arm (3) to define a second rotation axis (b) and the inner end of the third arm (5) being rotatably coupled to the outer end of the second arm (4), to define a third rotation axis (c);

motor means (2) for rotating the first arm (3) about the first axis (a) with respect to the support base;

support means (30), for supporting an object, attached to the outer end of the third arm (5);

transmission means mounted inside said arms and comprising a first transmission means (13) in said first arm (3), linked between said support base (1) and the second arm (4) to control the rotation of the second arm; a second transmission means (16) in said second arm (4), linked between the outer end of the first arm (3) and the third arm (5) to control the rotation of the third arm, a third transmission means (19) linked between the outer end of the second arm (4) and the support means (30) to control at least one of translational and rotational movements of the support means with respect to the support base (1); and driving means (10, 11) for providing a power transfer coupling between said motor means (2) and said first arm (3) to control the rotation of the first, second and third arms, so that the first, second and third transmission means are driven by the motor means;

a first toothed wheel (12) integrally mounted to said support base (1) co-axially with the first rotation axis (a) of said first arm (3), and a second toothed wheel (14) located in the first arm (3), co-axial with the second rotation axis (b) of said second arm (4) and integral therewith, the first transmission means (13) comprising a non-slip drive linkage connected between the first and second toothed wheels (12, 14);

a third toothed wheel (15) integrally mounted to the outer end of said first arm (3) co-axial with said second axis (b) and a fourth toothed wheel (17) located at the outer end of the second arm (4), co-axial with said third rotation axis (c) of the third arm (5) and integral therewith, the second transmission means comprising a second non-slip drive linkage connected between the third and fourth toothed wheels (15, 17);

a fifth toothed wheel (18) located at the inner end of said third arm (5), co-axial with said third axis (c) and integral with the outer end of the second arm (4); and a sixth toothed wheel (20) located at the outer end of the third arm (5), coaxial with an axis defined by said support means (30), the third transmission means comprising a third non-slip linkage connected between the fifth and sixth toothed wheels, the respective transmission ratios of said first, second and third transmission means (13, 16, 19) being respectively $\tau 1$, $\tau 2$ and $\tau 3$, where $\tau 1$, $\tau 2$ and $\tau 3$ are defined as the ratio between the toothed wheels connected by the respective first, second and third transmission means.

2. A mechanism according to claim 1, wherein the first transmission means (13) comprises an idle gear located between and intermeshing with the first and second toothed wheels; said third toothed wheel (15) is formed as a first bevel gear (15a), which is co-axial with said second axis (b) and fixedly mounted to said first arm (3), and a second bevel gear (15b) is located in and coaxial with said second arm (4), the first bevel gear (15a) being in meshing engagement with the second bevel gear (15b) to form a first bevel gear pair; said fourth toothed wheel (17) is formed as a fourth bevel gear (17b), fixedly mounted to said third arm (5) co-axially with said third axis (c), and a third bevel gear (17a), located in and coaxial with said second arm (4), is in meshing engagement with the fourth bevel gear to form a second bevel gear pair; said second transmission means comprises a tubular element (16) connected between the second and the third bevel gears (15b, 17a); and wherein said third transmission means comprises a reduction gear (19) located between and coupled to said fifth and sixth toothed wheels (18, 20) by means of toothed belts (19a, 19b);

the transmission ratios between the second arm (4) and the first arm (3) and between said third arm (5) and said second arm (4) being respectively $\tau 1$ and $\tau 2$, where $\tau 1$ and $\tau 2$ are defined as the ratio between the first and second toothed wheels (12,14) and the ratio between the first and second bevel gear pairs (15, 17), respectively.

3. A mechanism according to claim 1, wherein said first, second and third rotation axes (a,b,c) are vertical.

4. A mechanism according to claim 1, wherein said rotation axes (a,b, c) are horizontal and the arms are balanced for movement in a vertical plane.

5. A mechanism according to claim 2 wherein said first, second and third axes (a,b,c) are parallel to each other and the outer end of the last arm, on which said support means (30) is mounted, travels in an elliptical path upon actuation of said motor means (2) defining an ellipse having its center on said first rotation axis (a).

6. A mechanism according to claim 5, wherein the second arm (4) has a length which is twice as much as a length of said first arm (3) and of the last arm (5), with the lengths of the first and last arms (3,5) being equal to each other, and the path travelled by said support means (30) is a harmonic rectilinear motion.

7. A mechanism according to claim 1, wherein said support means (30) is a clamp operated by an independent actuating means for opening and closing the clamp which passes through said arms (3,4,5).

8. A mechanism according to claim 2, wherein each of said first, second and third transmission means (13, 16, 19) comprises a tubular rigid shaft.

9. A mechanism according to claim 3, wherein each of said transmission means (13, 16, 19) in any arm (3,4,5) is formed as one of a toothed and planar belt.

* * * * *